(12) United States Patent
Wright

(10) Patent No.: US 12,401,762 B2
(45) Date of Patent: Aug. 26, 2025

(54) ANNOTATION ANCHOR FOR SCREEN SHARING

(71) Applicant: Zoom Video Communications, Inc., San Jose, CA (US)

(72) Inventor: Gregory Wright, Cameron Park, CA (US)

(73) Assignee: Zoom Communications, Inc., San Jose, CA (US)

( * ) Notice: Subject to any disclaimer, the term of this patent is extended or adjusted under 35 U.S.C. 154(b) by 264 days.

(21) Appl. No.: 18/102,459

(22) Filed: Jan. 27, 2023

(65) Prior Publication Data
US 2024/0259526 A1    Aug. 1, 2024

(51) Int. Cl.
| | | |
|---|---|---|
| H04N 7/15 | (2006.01) | |
| G06F 3/14 | (2006.01) | |
| G06T 11/20 | (2006.01) | |
| G06V 10/10 | (2022.01) | |
| G06V 10/74 | (2022.01) | |
| H04N 5/265 | (2006.01) | |

(52) U.S. Cl.
CPC ........... *H04N 7/152* (2013.01); *G06F 3/1454* (2013.01); *G06T 11/203* (2013.01); *G06V 10/16* (2022.01); *G06V 10/761* (2022.01); *H04N 5/265* (2013.01); *H04N 7/155* (2013.01)

(58) Field of Classification Search
CPC combination set(s) only.
See application file for complete search history.

(56) References Cited

U.S. PATENT DOCUMENTS

| | | | |
|---|---|---|---|
| 9,961,302 B1 * | 5/2018 | Henderson | H04N 7/152 |
| 10,887,549 B1 * | 1/2021 | Wehrung | H04L 65/403 |
| 2016/0283455 A1 * | 9/2016 | Mardanbegi | G06F 3/038 |
| 2017/0286384 A1 * | 10/2017 | Dunne | G06F 9/451 |
| 2022/0374585 A1 * | 11/2022 | Wang | G11B 27/031 |
| 2023/0244434 A1 * | 8/2023 | Weiss | G06F 40/169 |
| | | | 715/753 |

* cited by examiner

*Primary Examiner* — Stella L. Woo
(74) *Attorney, Agent, or Firm* — Kilpatrick Townsend & Stockton, LLP

(57) ABSTRACT

The present disclosure relates to systems and methods for providing annotations that anchor to a background during a screen share presentation. The systems and methods include steps for receiving a video conference stream at a client device, displaying a shared screen within a content window of the video conference stream on a display in communication with the client device, receiving one or more annotations from a user input device in communication with the client device, capturing one or more snapshots for the one or more annotations, anchoring the annotation to content from the shared screen within the content window using the one or more snapshots, and situating the one or more annotations within the content window based on the anchoring.

20 Claims, 16 Drawing Sheets

ANNOTATION ANCHOR FOR SCREEN SHARING

FIELD

The present disclosure relates generally to anchoring annotations, and more particularly, to providing annotations that anchor during a screen share presentation.

DETAILED DESCRIPTION

Figure 1:
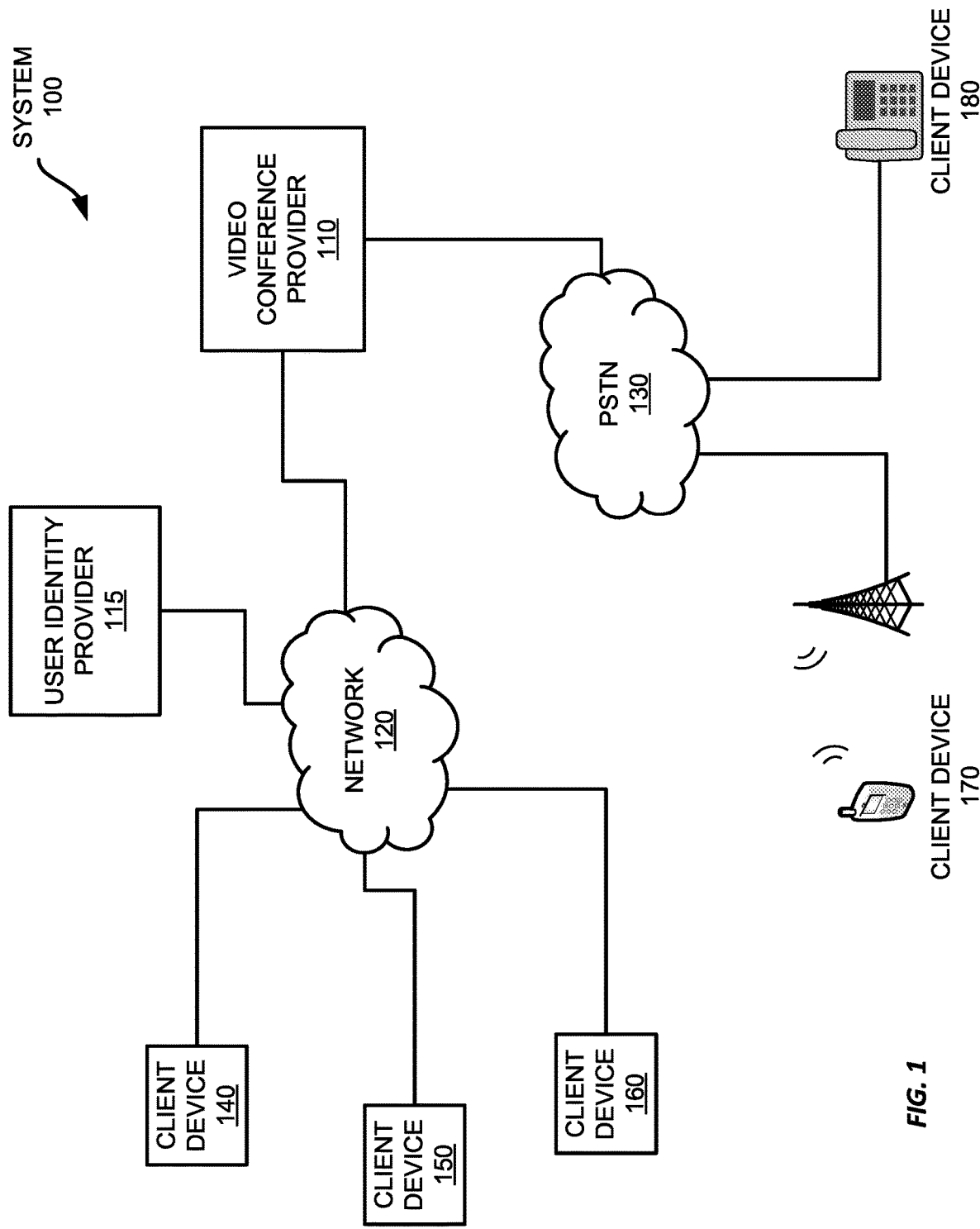
FIG. 1 is an illustration depicting an example video conferencing system in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Video conferencing applications include a variety of tools that enable users to communicate and share information between one another. One of those tools is the ability to share your screen or have another user share their screen. Screen sharing can be a useful tool when collaborating, instructing, troubleshooting, demonstrating etc. and can be enhanced by the introduction of annotations. The annotations can be added by the user sharing their screen and by other users viewing the shared screen. Since annotations are provided by any combination of users, the annotations may be displayed "on top" of a shared presentation and not necessarily within the presentation itself. Once an annotation is made, it is static (and may be persistent), so when background changes, the annotation value loses context quickly. This situation is created when the positioning of the shared screen is under the control of one user while other users may wish to annotate the shared presentation can create a moving target. This is especially true during a live conversation in which one user is in control of a shared screen while a second user is trying to annotate that screen. For example, the second user tries to point to a point on the screen and the first user substantially simultaneously or shortly thereafter moves the background shared screen, making the added annotation inaccurate. Such occurrences can lead to a negative user experience causing frustration and confusion between users. Thus, because traditionally there is no relationship between what is being displayed on screen and where an annotation is intended to be located on that screen share, it can be difficult for annotations to be placed where they are intended.

The present disclosure discusses the use of anchored annotation within the presentation such that the annotations travel with the intended target content instead of remaining at a static position. The anchored annotations can be added to the location it was originally intended (e.g., proximity to a target content or area) on the screen share and can travel with the intended location/target. Therefore, if the content of the shared screen moves around from the original position, the anchored annotation stays where it was intended. The functionality of using anchored annotations during a screen share dramatically improves the user experience. This includes reducing frustrating misplaced annotations, reducing the time needed to instruct or troubleshoot another user sharing their screen, and increasing adoption of annotation tools to improve workflow.

The present disclosure implements methods that enable to anchored annotations enables annotations to move with the target content (e.g., when a sharing user moves that content by scrolling up, down left, right, etc.), removing the annotation when the target content is no longer in view, and adding the annotation back when the target content returns to view. The linking of the annotation can be performed using a variety of techniques. In one example, image processing or pattern matching can be implemented to match captured snapshots of annotation placements with the background content. The captured snapshots can be used to track the positioning and/or presence of the underlying background content such that the annotations can be overlayed at the appropriate location (e.g., at the same location as the original target content). In another example, image stitching can be implemented to create an expanding canvas in which annotations and their related content are continually saved and recalled.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
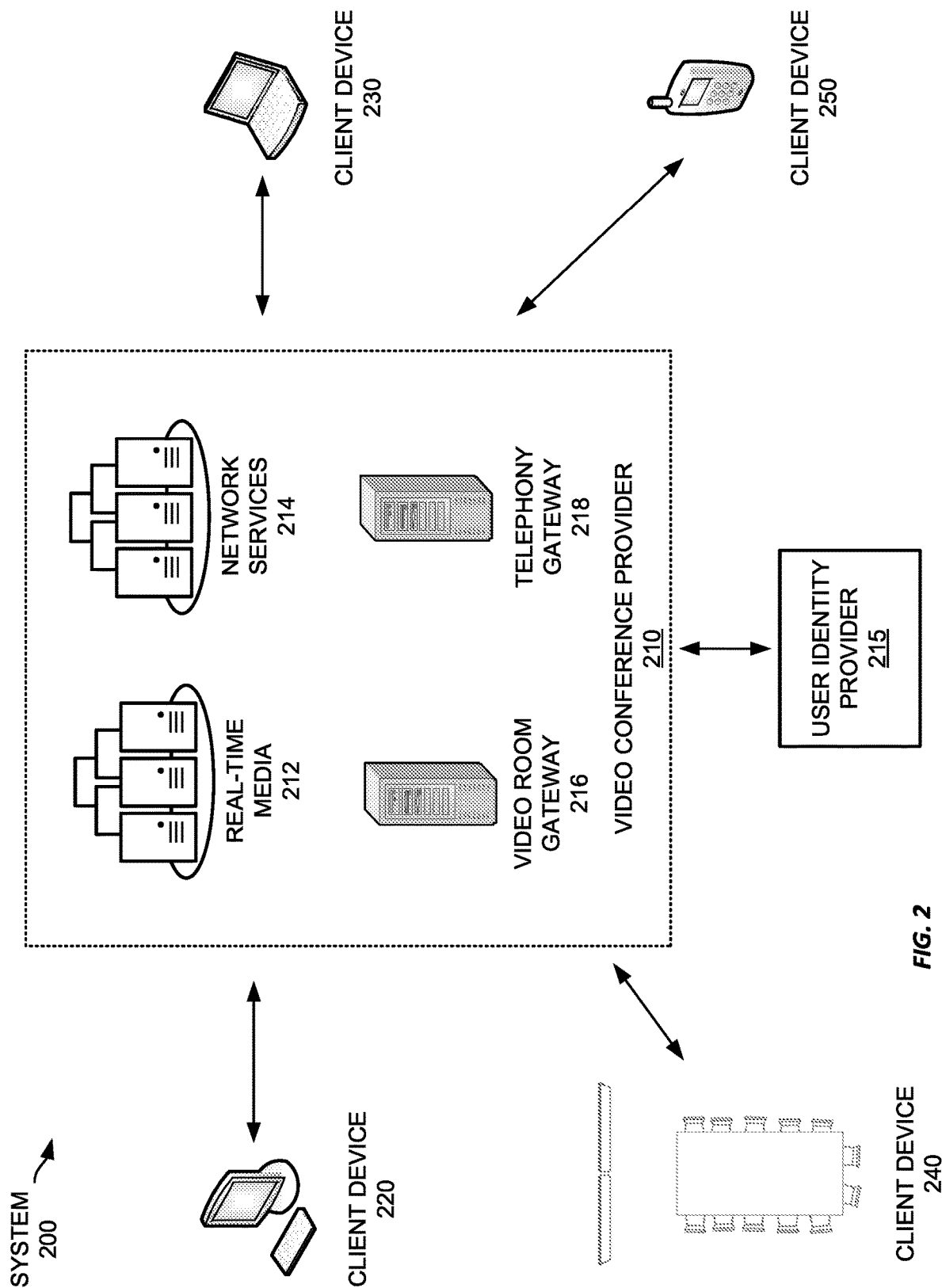
FIG. 2 is an illustration depicting an example video conferencing system in accordance with various embodiments.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which users are connected. The room in this context is a construct provided by a server that provides a common point at which the various video and audio data is received before being multiplexed and provided to the various users. While a "room" is the label for this concept in this disclosure, any suitable functionality that enables multiple users to participate in a common videoconference may be used. Further, in some examples, and as alluded to above, a meeting may also have "breakout" rooms. Such breakout rooms may also be rooms that are associated with a "main" videoconference room. Thus, users in the main videoconference room may exit the room into a breakout room, e.g., to discuss a particular topic, before returning to the main room. The breakout rooms in this example are discrete meetings that are associated with the meeting in the main room. However, to join a breakout room, a user must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of users, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the users may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various users are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous user in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other users in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the users or generating transcripts of the meeting for the users. End-to-end encryption may be used to keep the meeting entirely private to the users without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250.

Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting users, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various users and publish those streams to the various users to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting user to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves.

Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting users to join, such a command may also be handled by a network services server 214, which may create a new meeting record corresponding to the break-out room and then connect one or more meeting users to the break-out room similarly to how it originally admitted the users to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining users from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
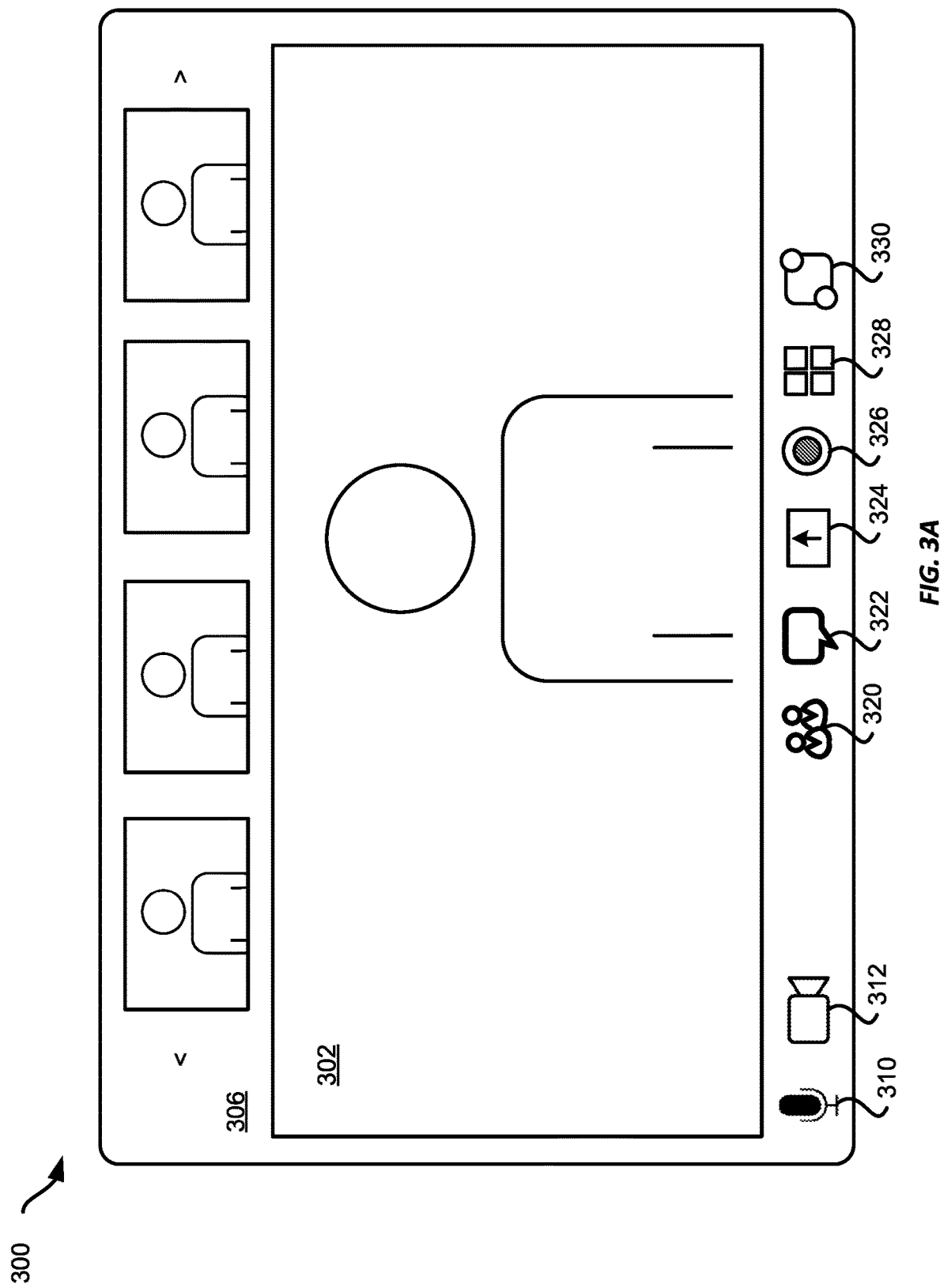
FIGS. 3A and 3B are illustrations of an example graphical user interface ("GUI") in accordance with various embodiments.
Figure 3B:
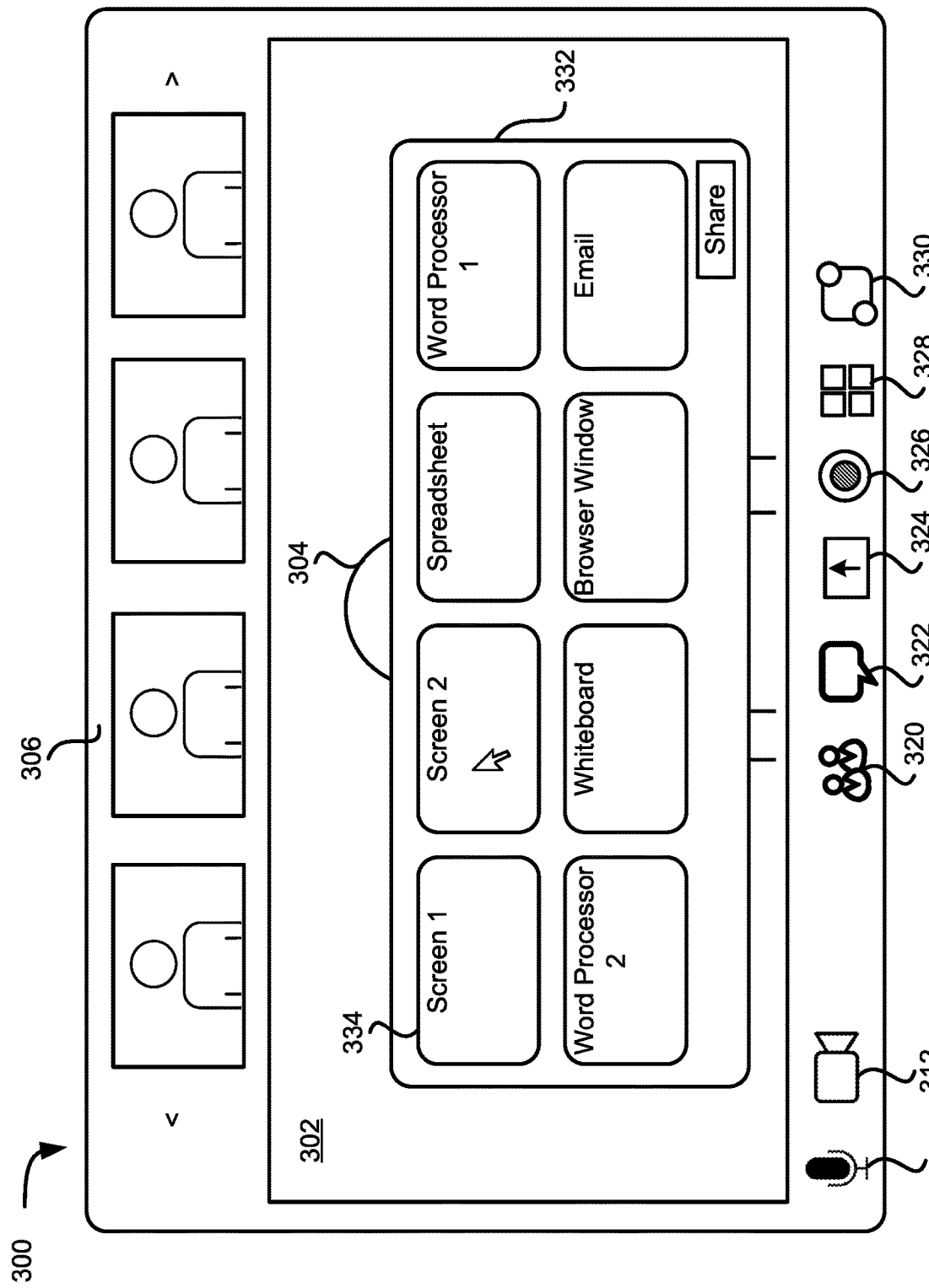

Referring now to FIGS. 3A and 3B, FIGS. 3A and 3B shows an example graphical user interface (GUI) 300 that a user's client device may display while interacting with other user(s) during a virtual meeting in a conversation. A client device, e.g., client devices 220-250, executes video conferencing software, which in turn displays the GUI 300 on the client device's display. Execution of the video conference software can connect to the video conference provider 210 to join a meeting. During the meeting, the various users, using video conference software at their respective client devices, are able to interact with each other to conduct the meeting, such as by viewing video feeds and hearing audio feeds from other users, and by capturing and transmitting video and audio of themselves.

The GUI 300 includes a toolbar that includes various user controls, as examples, controls for video devices, microphones, chat functions, gesture functions, and recording functions. FIG. 3A shows an example group of controls 310-330. Controls 310 and 312 may allow the user to toggle on or off audio or video streams captured by a microphone or camera connected to the client device. Control 320 allows the user to view any other users in the video conference with the user, while control 322 allows the user to send text messages to the other users. Control 324 allows the user to share content from their client device. Control 326 allows the user to toggle recording of the meeting, and control 328 allows the user to select an option to join a breakout room, though in this example, with only two users, breakout room functionality may be disabled. Control 326 allows the user to toggle various applications that may be integrated with the video conferencing software.

The GUI 300 also includes a main viewing area 302 for use during a video conference. The main viewing area 302 of the GUI 300 may display various images or videos depending on the configuration of the GUI 300 chosen by the videoconference user. In the example provided in FIG. 3A, the main viewing area 302 is displaying an image of the current or active speaker 304 in a videoconference. The GUI 300 also includes a gallery strip 306. Gallery strip 306 displays thumbnail images of the most recent speakers in the videoconference. The controls 310-330 can also be used to interact with or change the main viewing area 302 of the GUI 300. For example, control 310 can toggle on video of the user within the main viewing area 302 and control 324 can change the main viewing area 302 from a video camera feed to a share screen feed.

Referring now to FIG. 3B, FIG. 3B shows an example graphical user interface (GUI) 300 that a user's client device may display in response to selecting the control 324. In response to selecting the control 324, a sharing window 332 can be opened. The sharing window 332 can include a plurality of selectable shareable windows 334 to be shared within the main viewing area 302 of the GUI 300. The selectable shareable windows 334 can be populated based on the available screens, applications, etc. that are running on the client device and/or hardware elements provided by the client devices. For example, as depicted in FIG. 3B, the sharing window 332 can include selectable shareable windows 334 for a first screen (e.g., first monitor), a second screen (e.g., second monitor), a window for an open spreadsheet application, a first window for an open word processor application, a second window for the open word processor application, a whiteboard application, a browser window, and an email window.

Selection of one of the selectable shareable windows 334 will cause the GUI 300 to display the source of the selectable shareable window 334 within the main viewing area 302. For example, if the user selects the selectable shareable window 334 for screen 2, as depicted in FIG. 3B, the main viewing area 302 will be updated and/or replaced to show the content located on screen 2 of the client computer. The selection of one of the selectable shareable windows 334 can be executed using any combination of methods. For example, a user can use a mouse to double click on the desired selectable shareable window 334 and/or the sharing window 332 can include a share button which can be used to change the main viewing area 302 after selection of one of the selectable shareable windows 334 (single click of a mouse). While a screen is being shared, the client device is capturing a video or image feed and delivering it to a service provider to be conveyed to the other users as part of a live presentation. The presentation can be configured to provide a shared content from one client device to the other client devices in a manner in which the other client devices follow along with the interactions on the one client device.

Referring now to FIGS. 4A-4D, FIGS. 4A-4D shows an example graphical user interface (GUI) 400 that a user's client device may display while sharing their screen and/or an application(s), for example, in response to selection of control 324 and a shareable windows 334. The example GUI 400 is similar to GUI 300, except that the speaker window 302 is replaced by a shared content window 402. The controls within the toolbar of the GUI 400 can also be updated to include controls that may be useful during a screen share (in addition to or in place of controls not useful during a screen share). For example, during screen sharing, the GUI 400 can include additional controls 336, 338 with functionality specific to screen sharing. Control 336 allows the user to pause or stop content being shared from their client device within the shared content window 402 and control 338 allows users to create annotations in the shared content window 402.

Figure 4A:
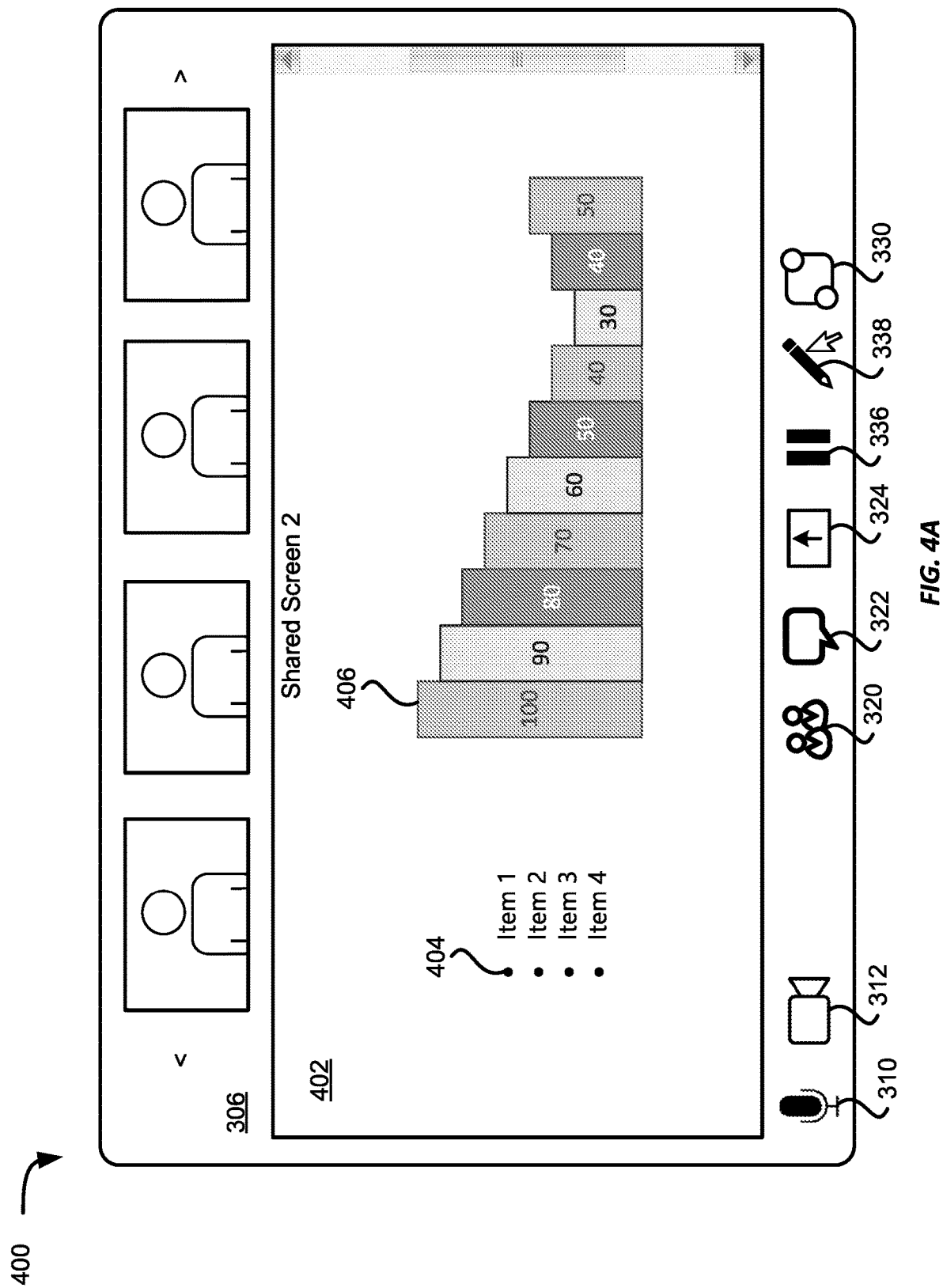
FIGS. 4A, 4B, 4C, and 4D are illustrations of an example graphical user interface ("GUI") in accordance with various embodiments.

In the example in FIG. 4A, a user is sharing their second screen (e.g., screen 2) that include a bullet list 404 and a bar graph 406 within the shared content window 402. The screen (or application) being shared is also designated within the shared content window 402, for example, Shared Screen 2 is displayed at the top center of the shared content window 402. When a user's screen is shared, the screen can be mirrored or streamed from a first user's client device to the client devices of other users participating within the virtual meeting, such that all users will see the same content within the shared content window 402. Even though all users see the same shared screen, within their respective client applications, only the user who is sharing their screen is able to modify how or what is being displayed to each of the users. For example, in the example of FIG. 4A, since the user is sharing a display/monitor, they can change what is shown in the shared content window 402 by modifying what application(s) is being displayed on their screen and what is being displayed within the application itself (e.g., scrolling up/down/left/right, changing tabs, changing windows, zooming in/out, etc.). The sharing user can also stop or pause sharing their screen, for example, by interacting with control 336. If the screen share is stopped, then the shared content window 402 will be replaced by the speaker window 302 as shown in FIG. 3A. If the screen share is paused, then the state of the shared content, at the time of pausing, will be displayed but will remain static, even if the sharing user is interacting locally with what is on their screen.

Figure 4B:
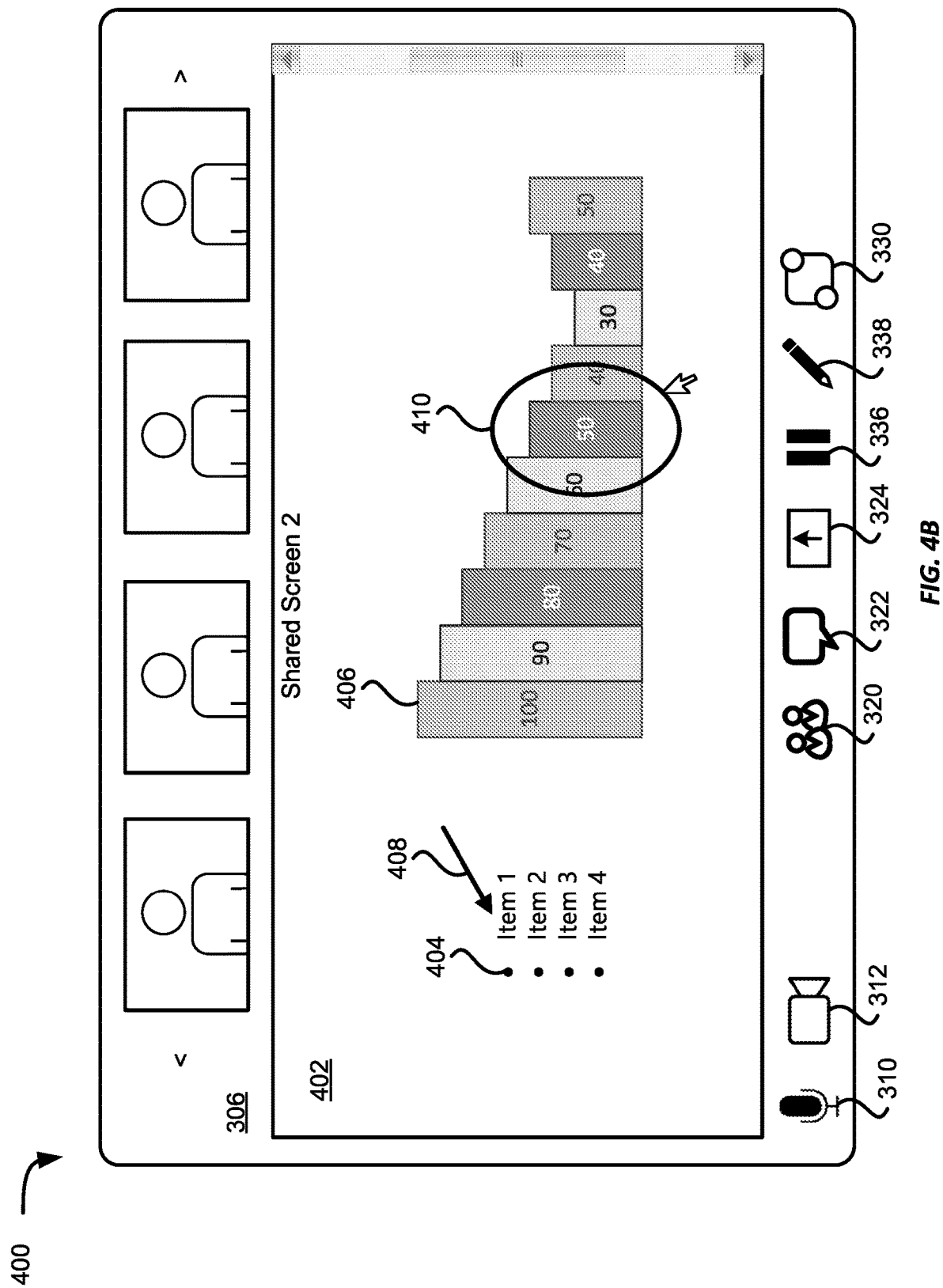

Referring now to FIG. 4B, FIG. 4B shows an example graphical user interface (GUI) 400 that a user's client device may display after annotations have been added to the content window 402. The annotations can be added in response to a user selecting control 338, selecting an annotation method, and creating an annotation within the shared content window 402. The annotation may serve to draw the attention of the users of the video conference. Any user participating in the virtual meeting can make annotations, including the presenter who is sharing their screen.

In FIG. 4B, the bullet list 404 and the bar graph 406 from FIG. 4A are shown with annotations 408 and 410 added proximate thereto. The annotations 408, 410 in FIG. 4B are an arrow and a circle, however, any combination of annotations can be provided. For example, annotations can include pointers, text, lines, outlines, shapes, free form drawings, stamps, highlights, etc. Users can annotate within the shared content window 402 by accessing the control 338. Upon selection of the control 338, during a screen share, the control 338 can open a menu including annotation tools. The annotation tools may include any combination of tools that may be useful for users interacting with or annotating a shared screen presentation. For example, the annotation tools can include tools for entering text, drawing lines or shapes, stamping, spotlighting/laser pointer, erasing, deleting, undoing, redoing, etc. Using the annotation tools provided by accessing control 338, any of the users within the virtual meeting are able to add annotations to the shared content window 402, including the user sharing the content. However, when sharing a screen (or application), annotations are traditionally static and will remain at the location they are initially placed, whereas the other content on the shared screen is not necessarily static.

Figure 4C:
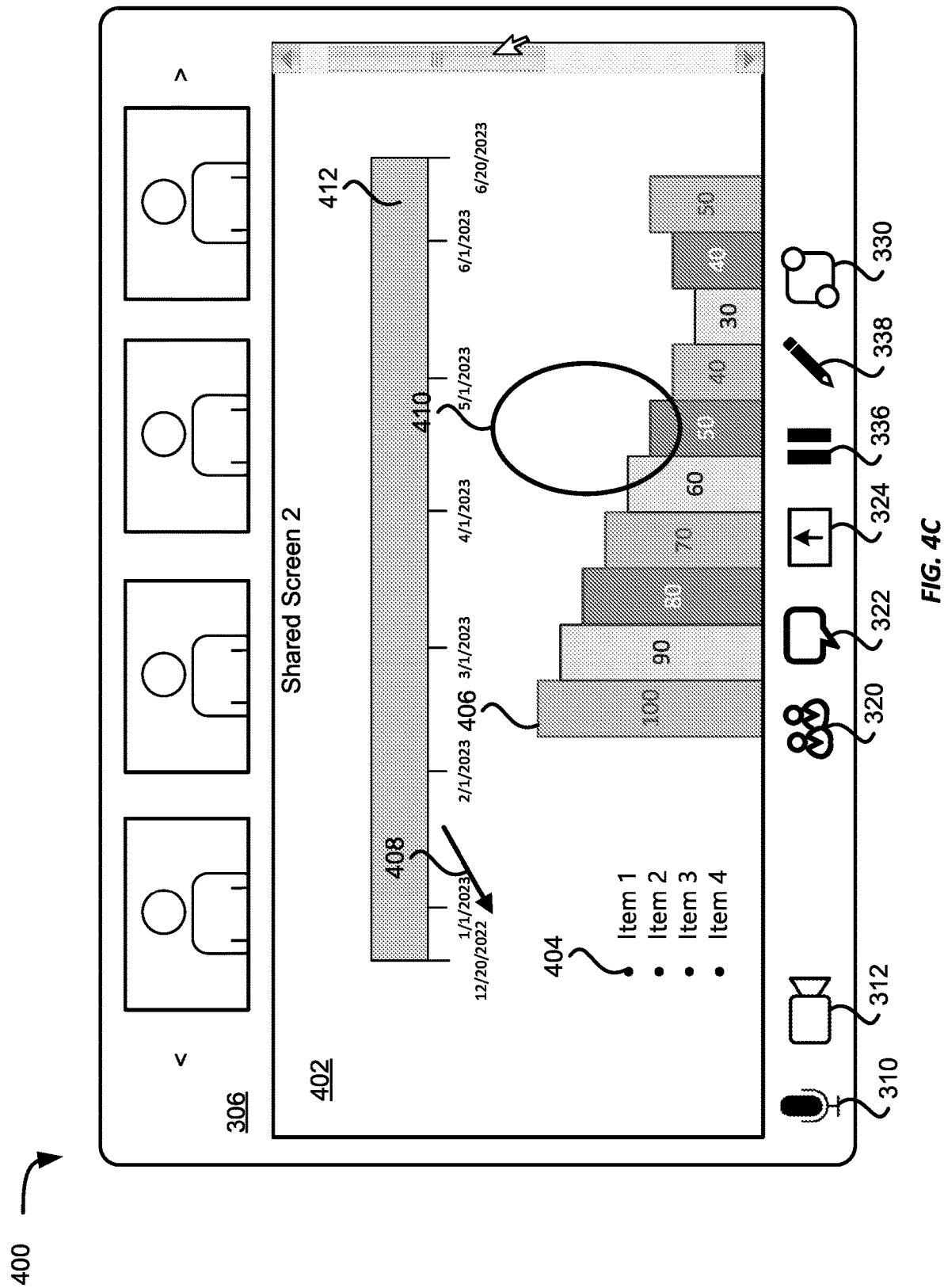

Referring now to FIG. 4C, FIG. 4C shows an example graphical user interface (GUI) 400 that a user's client device may display after annotations have been added to the shared content window 402 and the sharing user has moved at least a portion of the shared content. In the example provided in FIG. 4C, the user has scrolled up on the page or window that the user was sharing, resulting in the content of the bullet list 404 and the bar graph 406 moving down within the shared content window 402 and revealing content of a timeline 412. Since the annotations 408, 410 are static and remain persistent at the location within the shared content window 402, the annotations 408, 410 did not move with the other content 404, 406, 412. Therefore, when a sharing user moves a screen that has been annotated or is currently being annotated, the annotations can immediately lose their value and may even cause confusion. For example, confusion may be caused if a user is watching back a video the annotation 408 is now pointing to the timeline 408 instead of the bullet list 404. This may also be frustrating to a user making annotations because what they are trying to reference is not accurate once a sharing user moves the shared content.

Figure 4D:
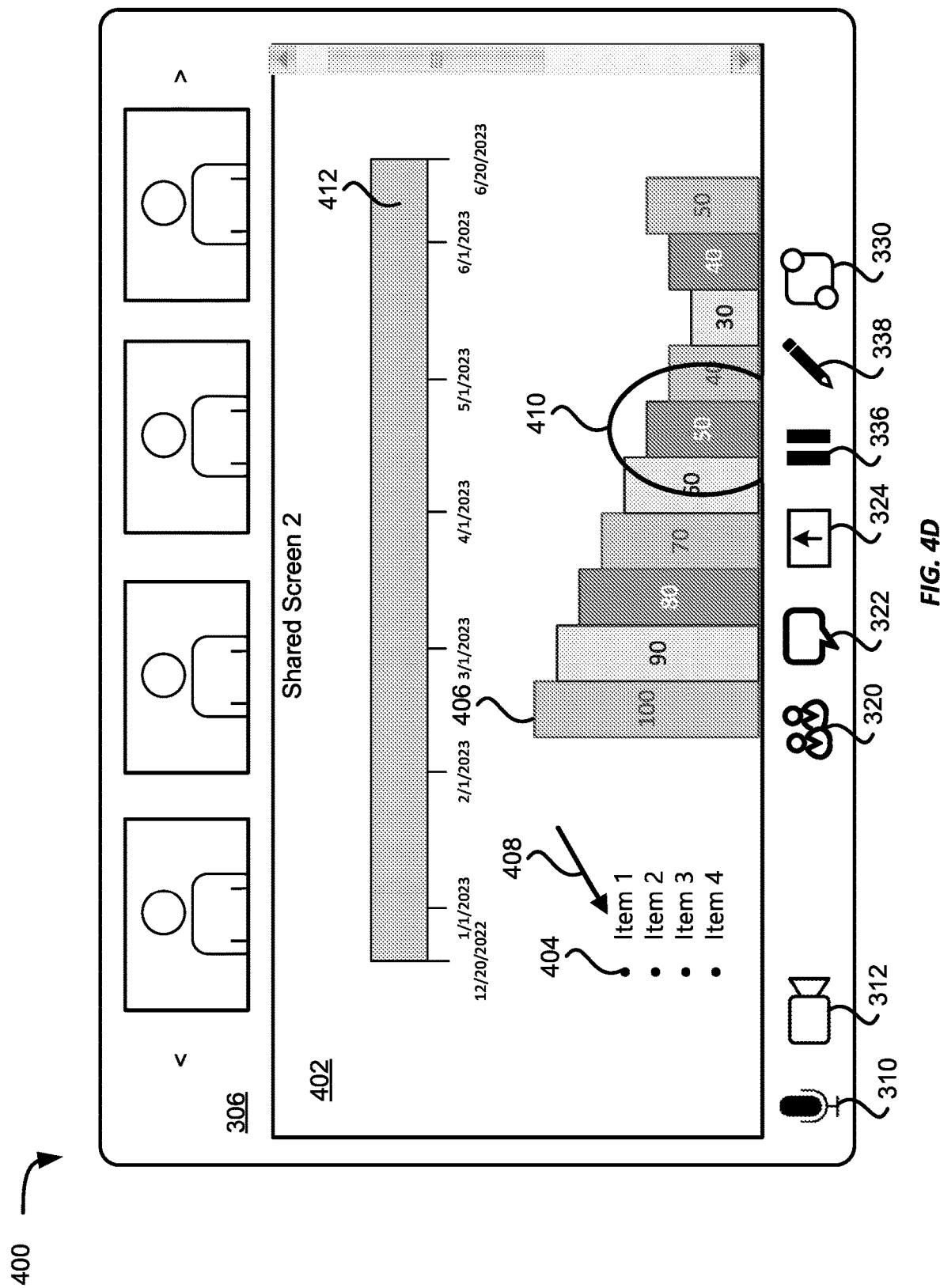

Referring now to FIG. 4D, FIG. 4D shows an example graphical user interface (GUI) 400 that a user's client device may display after anchored annotations have been added to the shared content window 402 and the sharing user has moved at least a portion of the shared content. In the example provided in FIG. 4D, the user has scrolled up on the page or window that the user was sharing, resulting in the content of the bullet list 404 and the bar graph 406 moving down within the shared content window 402 and revealing content of a timeline 412. Since the annotations 408, 410 are anchored, they travel with the displayed content within the shared content window 402. For example, the annotations 408, 410 moved with the content bullet list 404 and bar graph 406, respectively. Therefore, when a sharing user moves a screen that has been annotated or is currently being annotated, the annotations maintain their value and alleviate any potential confusion that may be caused by static annotations (e.g., as shown in FIG. 4C). The annotations 408, 410 can be anchored using any combination of systems or methods, for example, as discussed with respect to FIGS. 5A-8.

Continuing with FIGS. 4A-4D, in some embodiments, the GUI 400 can be generated using multiple layers overlayed on one another. The multiple layers can include a background layer, a shared content layer (content of the shared screen or application) overlaid on the background, and an annotation layer overlaid on the shared content layer. The shared content window 402 and content being displayed therein can be made up from any combination of the background layer, the shared content layer, and the annotation layer. In the example shown in FIGS. 4A-4D, the annotations 408, 410 are created in the annotation layer that is displayed on top of the shared content layer within the shared content window 402. As such the content layer can be left unmodified while the annotation layer is modified as annotations are added, edited, or removed. The annotation layer could be considered similar to a transparent cell that includes the annotations (e.g., annotations 408, 410) being laid on top of a background including content (e.g., content 406, 408, 412) of the shared content layer to create the entire display viewed by users. The annotation layer may be created such that its edges are at the same location as the edges of the shared content layer and the z-order of the annotation layer is set so that it is displayed on top or in front of the shared content layer. This may allow the annotation layer and the shared content layer to be "locked" to each other, which may anchor annotations within the annotation layer to change in lockstep with the shared content layer.

The annotation layer may also include composition attributes that define how the annotation layer is composited with or blended with the shared content layer. In one such example, the annotation contains metadata defining the annotation. For instance, the metadata may include the type of annotation, the size, and the location of the annotation. In another example, the metadata includes a vector representation of the annotation or annotations displayed during the screen share.

Figure 5A:
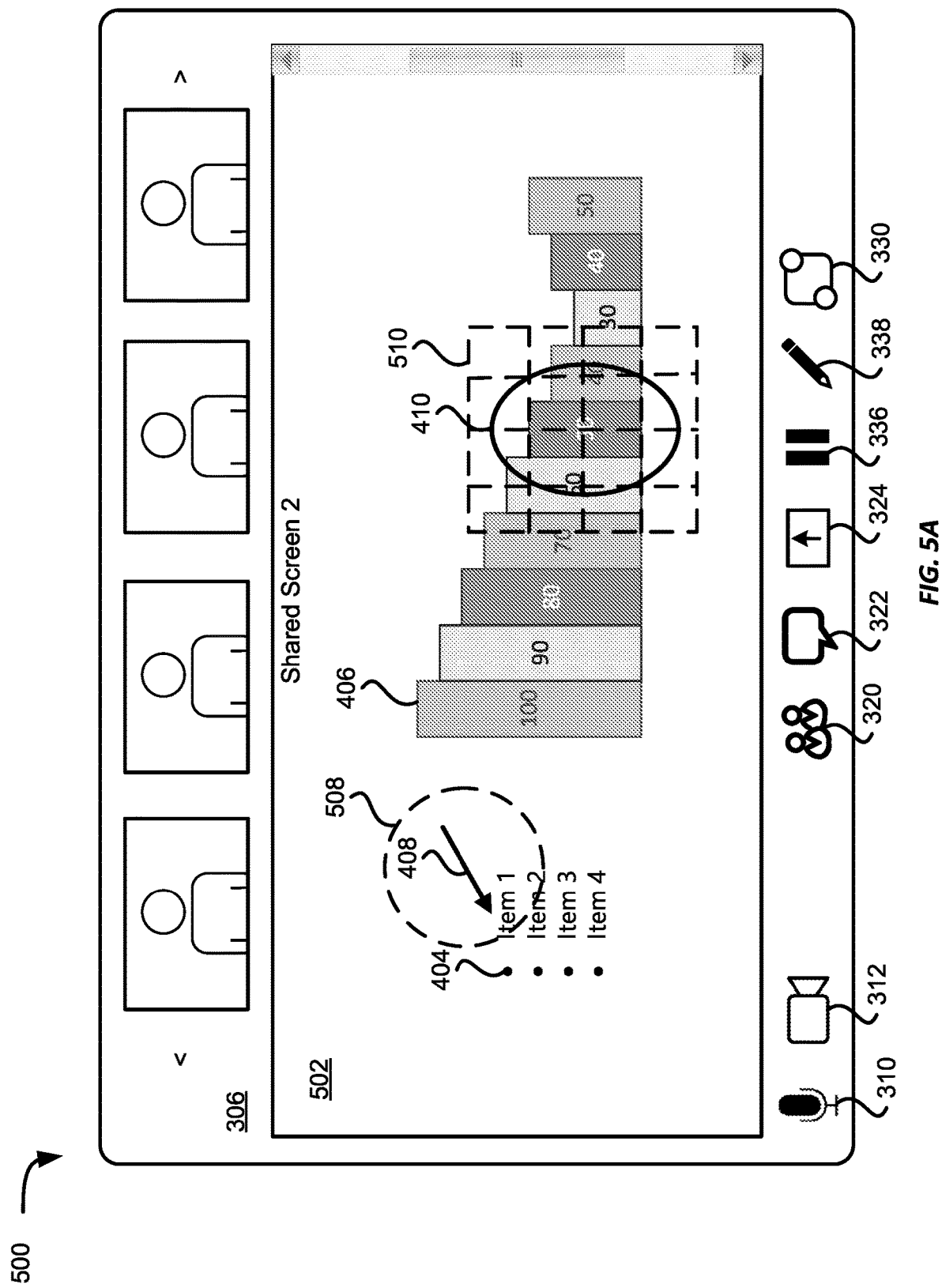
FIGS. 5A and 5B are illustrations of an example pattern recognition in accordance with various embodiments.
Figure 5B:
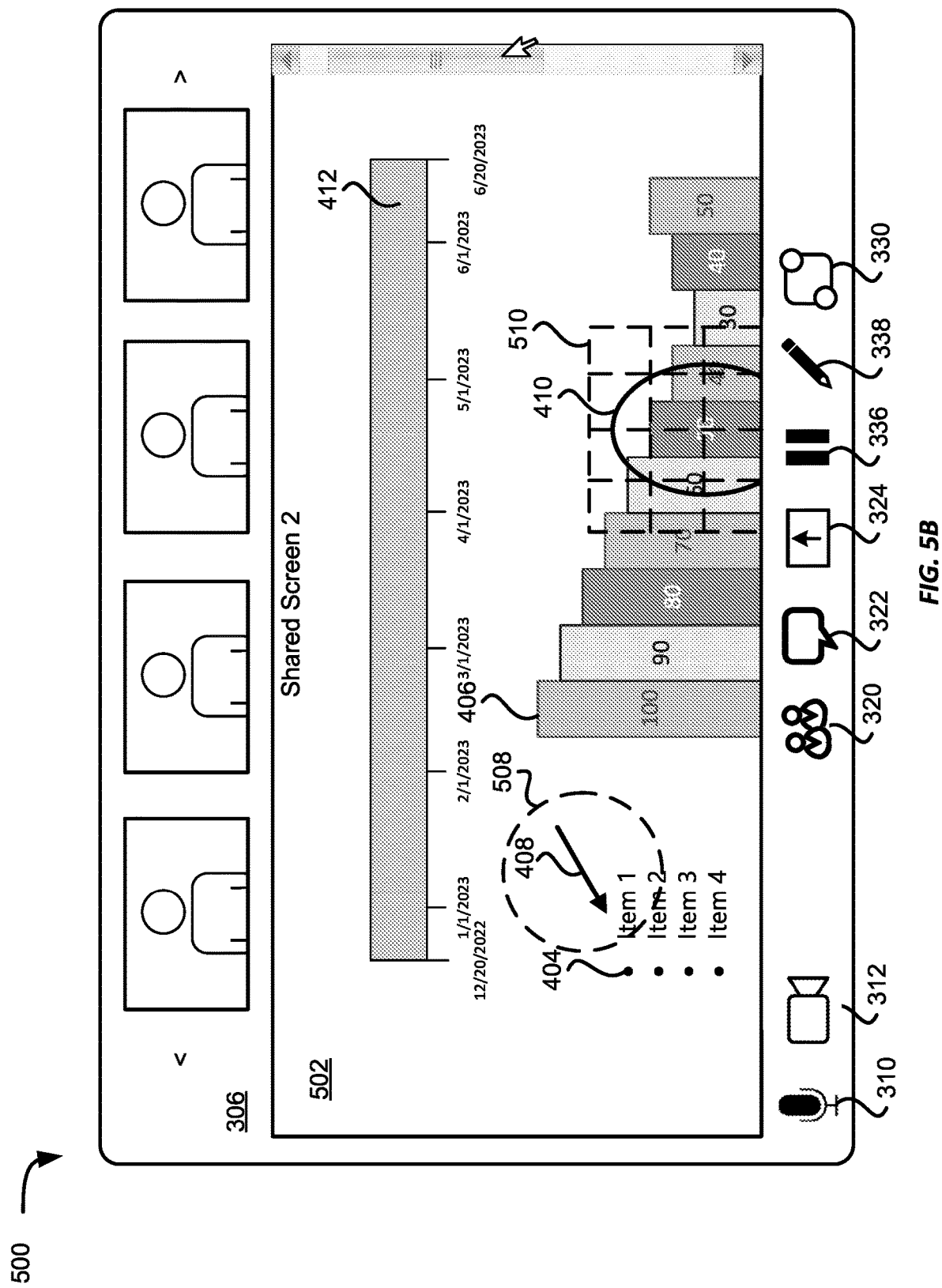

Referring to FIGS. 5A-5B, FIGS. 5A-5B show example diagrams 500 for a method for anchoring the annotations using image recognition and/or pattern matching. The annotations can be locked by default of they can be optionally locked by a user, for example, selecting an option under control 338. The anchoring of the annotations, as provided in FIGS. 5A and 5B will allow the annotations to move with the appropriate content when the shared content window 402 changes or moves. For example, when a user scrolls up the annotations will move with the appropriate displayed content, as shown from FIG. 4B to FIG. 4D. This may also include removing the annotation when the associated content is moved offscreen and reproducing the annotation when the associated content is moved back on screen. For example, if the user changes tabs in a browser, the annotation made in the first tab view should be removed while in the second tab view but added back when the user returns to the first tab view. This is in contrast to conventional annotations in a shared screen which would remain in the same location as the user changes tab views.

To establish an annotation anchor, once an annotation(s) is placed by a user during a share screen, the system (e.g., system 100, 200) may establish a pattern to anchor or lock that annotation to if/when the share screen changes over time. In other words, the system can detect placement of the annotation, identify a pattern of the surrounding area (or content) for that annotation, and anchor the annotation to that identified pattern such that, as the pattern moves or disappears, so does the annotation. Since the combination of shared screen (or application) possibilities with user placed annotations configurations (e.g., type, location, size, color, etc.) can include infinite possibilities, a pattern or template is first created whenever an annotation(s) is added or modified during a shared screen presentation.

The pattern can be automatically created by the system anytime an annotation is created or changed, for example, anytime an annotation is placed, moved, edited, or removed from within the shared content window 402. To create the pattern, anytime a user adds or changes an annotation, a snapshot of the shared content window 402 (including all the layers thereof) or a portion of the shared content window 402 (or one or more of its layers) thereof can be automatically captured and stored by the system for future reference (e.g., matching, pattern recognition, image recognition, etc.). For example, the snapshot can include the image data for the shared content window layer but not the annotation layer, such that the annotation itself is not included within the pattern for image recognition. The snapshot(s) can include any combination of image capturing or data capturing processes needed to recognize which part of the shared content window 402 an annotation should be anchored. For example, as depicted in FIGS. 5A and 5B, the snapshots 508, 510 can be an image capture of an area surrounding an annotation. The snapshots can vary in size, shape, dimension, etc. For example, with each annotation creation or addition, a snapshot of the entire shared content window 402 can be captured, a single portion of the shared content window 402 can be captured, a plurality of portions of the shared content window 402 can be captured, predetermined areas of the shared content window 402 can be captured, or a combination thereof.

FIGS. 5A and 5B show two different examples of types of snapshots 508, 510 being captured. The first snapshot 508 is a circular image capture surrounding the arrow annotation 408. Although a circle is provided as an example, any combination of shapes or outlines of the annotation can be used. The snapshot can be centered around the annotation itself, it can an area(s) proximate to the annotation, or a combination thereof. The snapshot should be provided in a manner in which it can be determined a portion of the displayed content that the annotation should be linked. In other words, the snapshot should provide sufficient information for the system to identify a location to which the annotation should be reproduced (or removed) when the content window 402 or changes. Continuing the example, the first snapshot 508 should be associated with an area that provides sufficient data such that the system can recognize that the arrow annotation 408 should be situated proximate to the bullet list 404 (in that specific location and orientation). The size and shape of the snapshot can vary depending on the annotation type, the location, and the amount of image data necessary to reliably identify a pattern for reproducing the annotation.

The second snapshot 510 provides an example in which the snapshot is a grid or array of captured images situated proximate to the annotation 410. The grid or array may be used to identifying portions of the annotation and/or the annotation as a whole. This may be useful for providing the annotation when the only a portion of the captured image data is being displayed and thus a portion of the annotation should be provided, for example, as annotation 410 shown in FIG. 4D and FIG. 5B. In other words, since the bottom of annotation 410 is cut off after the user scrolls up, the grid can be used to reproduce the annotation as shown in FIG. 4D instead of requiring a whole pattern matching as would be required by the example snapshot 508. Similar to the example snapshot 408, the size and shape of the snapshot and its grids can vary depending on the amount of information needed to accurately reproduce the annotation when the shared content window 402 moves or changes.

The snapshots or pattern can be created as part of their own layer. For example, the snapshots 508, 510 as shown in as in FIGS. 5A and 5B, can be included within a single pattern layer or separate pattern layers. The pattern layer(s) can be created in the background such that it is not visible to the users. The pattern layer(s) can be overlayed on the shared content layer such that when one or more of the snapshots within the pattern layer(s) matches the content of the underlying shared content layer, then the corresponding annotations (or annotation layer) can be moved and/or loaded for display. Alternatively, each of the snapshots can be associated with their respective annotations including a set of parameters (e.g., annotation type, size, shape, color, orientation, etc.), the snapshots and associated annotations can be saved, and all snapshots can be periodically compared against the shared content window 402 for a match with the displayed content. For example, if a snapshot is taken of the bullet list 404 because it has been highlighted using an annotation tool, whenever the bullet list 404 moves within the shared content window 402, the snapshot will identify the movement and load the corresponding highlighting annotation. The annotation parameters can be gathered when the annotation is created and then can be associated with a snapshot. In addition to annotation parameters, information about the screen or application share can be captured. The metadata associated with the screen or application being shared can be captured, providing additional information for when and where an annotation should be displayed as the shared content window 402 changes.

Although two different types of snapshots are shown in FIGS. 5A and 5B (e.g., a circle and a square), when implemented, all of the snapshots can be the same type or a combination of different types. For example, all of the snapshots can be square grids surrounding the annotation or different annotations can use different types of snapshots (e.g., rectangle for arrow, circles for outlines). The types/number of/locations snapshots can be application specific and different snapshot templates can be used for each application. For example, certain snapshot types/number of/locations can be used when a user is sharing a word processing application than the types/number of/locations of snapshots used when a user is sharing one of their screens.

Figure 6A:
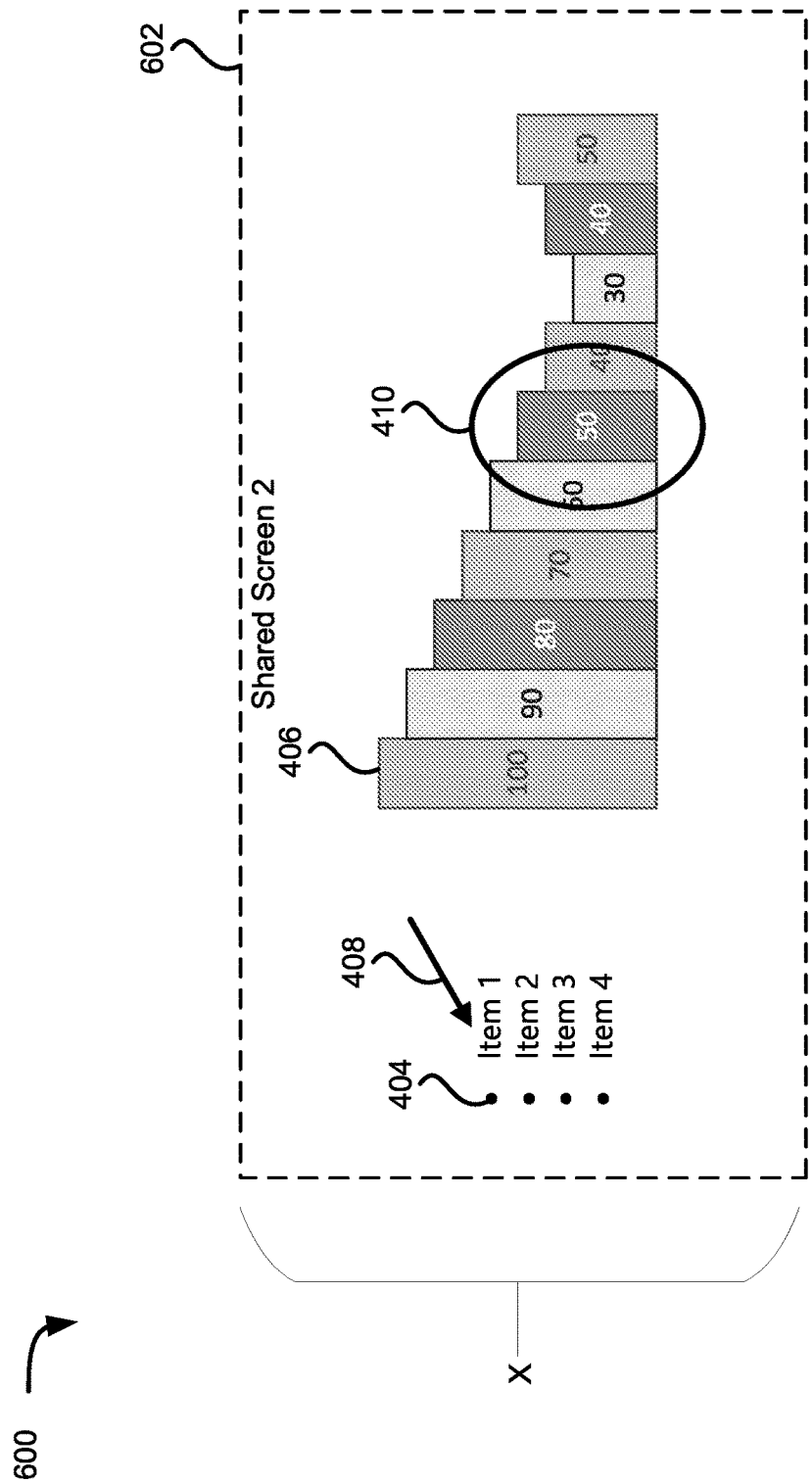
FIGS. 6A, 6B, and 6C are illustrations of an example stitching operation in accordance with various embodiments.
Figure 6B:
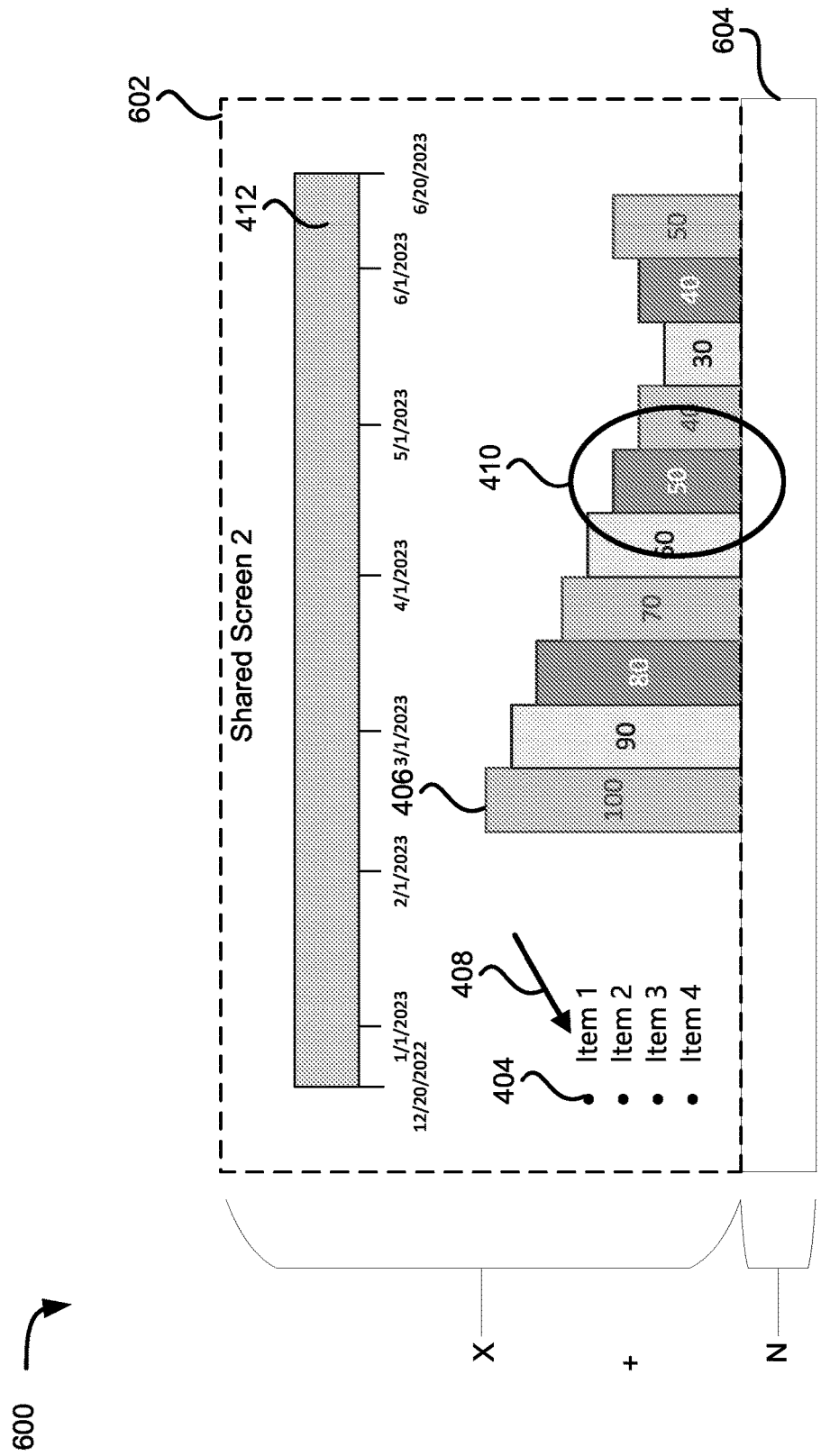

Once the snapshots, patterns, pattern layer, etc. are created, then that information can be used for pattern matching or image recognition to anchor the annotations to the appropriate content. The pattern matching or image recognition can be performed using any combination of artificial intelligence, machine learning, neural networks, etc. to compare the captured pattern to the active Referring to FIGS. 6A-6B, FIGS. 6A-6B show example diagrams 600 for a method for anchoring the annotations using image stitching. Image stitching is the process of combining multiple images with overlapping fields of view to produce a segmented panorama or high-resolution image. The stitching used with respect to the present disclosure, can include any combination of stitching methods or systems. When implementing image stitching for annotation anchoring, each movement of the shared content window 402 can be tracked and captured. For example, if a user scrolls, up, down, left, or right, then the "new" area(s) revealed within the shared content window 402 are captured. The captured images of the shared content window 402 can then be stitched together to create an expanding image of the shared content window 402.

Figure 6C:
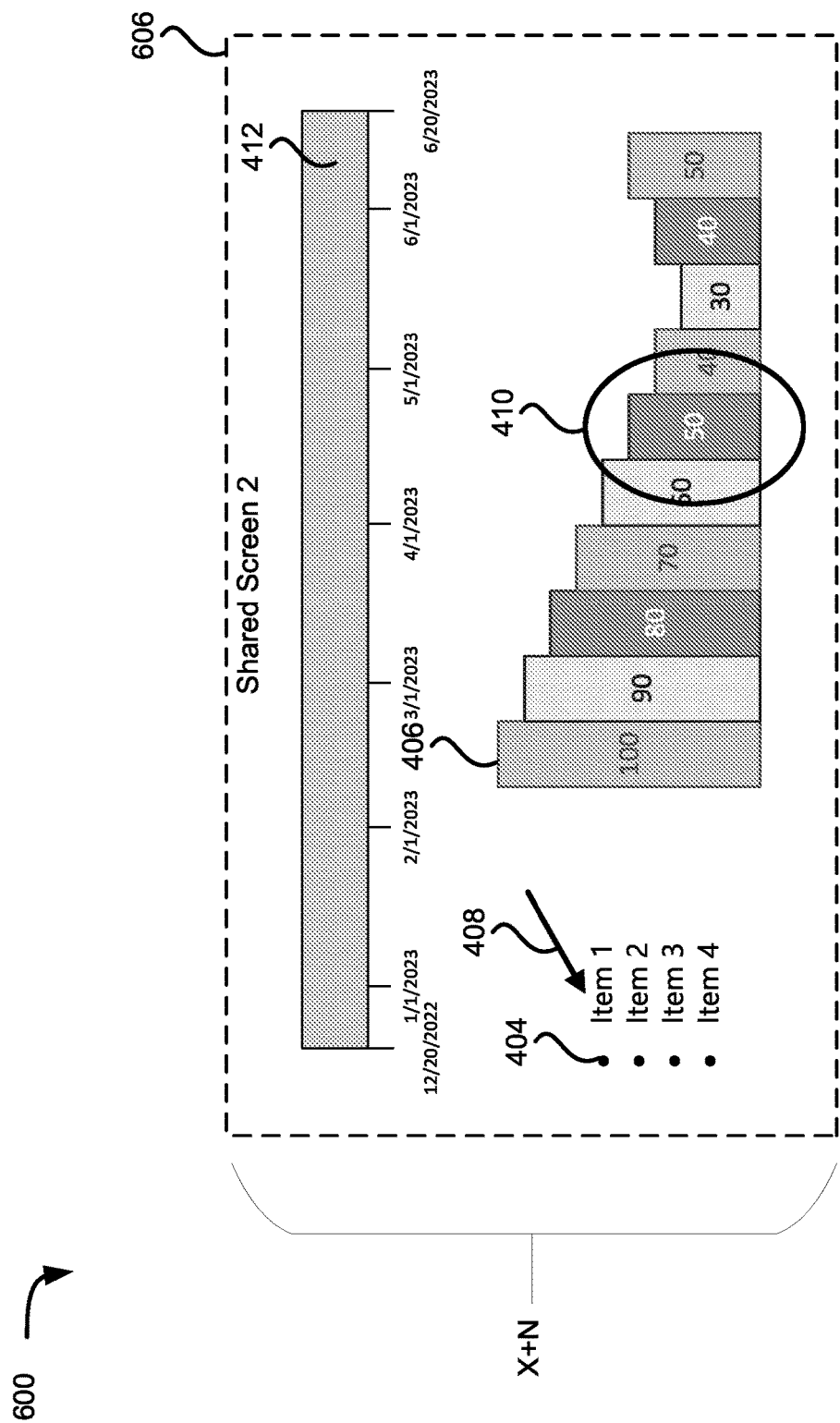

FIG. 6A shows an example shared content window 602 that is initially captured (e.g., within GUI 300, 400, 500) and FIG. 6B shows an example shared content window 602 after a user has scrolled up, revealing additional timeline 412 content and hiding previously viewable space below the bar graph 410. FIG. 6B shows the updated shared content window 602 and the no longer visible space 604 of the shared content window 602 from FIG. 6A. FIG. 6C shows an example of a stitched content window 606 which is created by combining the captured images from the shared content windows 602 from both FIGS. 6A and 6B. The height of the shared content window 602 which is provided to the user is X, the vertical scrolling by the user, as provided in the example of FIG. 6B, is N, and the combined height of the stitched content window 606 is X+N. The stitching of the content windows can be performed using any combination of systems and methods.

To anchor annotations within the stitched content window 606, the system can capture the shared content window 602 whenever an annotation is made and/or whenever movement (after an annotation has been added), such as scrolling, occurs. Thereafter, all of the captured screens can be stitched together to form the stitched content window 606. The stitched content window 606, or a portion thereof, can be used as the share screen instead of the local share screen provided by the client or the stitched content window 606 can be used as an annotation layer to the shared content screen provided by the client. For example, the stitched content window 606 can be shared with the service provider device and/or the other client devices, including the sharing user's screen. The stitched content window 606 can be layered with a shared content window by matching content within the stitched content window 606 to the original content of the shared content window 602. The matching can be performed by using any combination of image recognition, pattern matching, location information, etc. Once matched, the stitched content window 606 can be layered over the shared content window to provide the annotations or replace the shared content window 602 itself.

Regardless of implementation, the annotation anchoring can be implemented in real time and played back from a recording. If the sharing user selects (or previously selected) control 326, the client device will cause the video conference to be recorded. Recording the video conference while the annotation 408, 410 is displayed causes both the video conference and the annotation to be stored. For example, the shared content layer and the annotation layer can both be saved as the presentation is recorded. The layers can be recorded together or separately. If separately, each recording can include time stamps such that they can be played back synchronously. The above-noted annotation metadata can also include a beginning time stamp and the period of time during which the annotation is displayed or the end time so that the annotation can be reconstructed and displayed synchronously with the video conference during replay of the video conference recording. There can also be an option to turn on or off the annotations or enable and disable annotations from particular users while viewing the recording.

Figure 7:
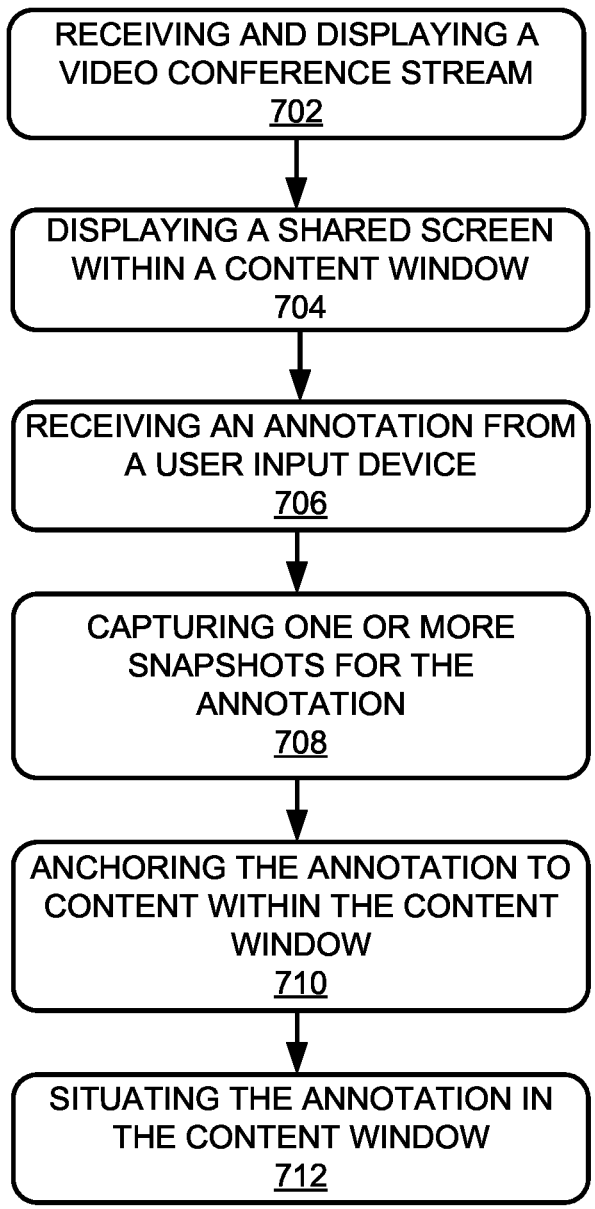
FIG. 7 is a flow chart depicting a process for using a reference in accordance with various embodiments.

Referring now to FIG. 7, FIG. 7 shows an example method 700 for creating anchored annotations using image recognition and/or pattern matching. The method 700 of FIG. 7 will be described with respect to the systems 100, 200 shown in FIGS. 1 and 2; however, any suitable system according to this disclosure may be employed. Although certain blocks of method 700 are discussed with respect to being performed by a client device, any combination of the steps (all or some) could be performed by each client, one client (and shared with other clients or the service provider device), by the service provider device, or a combination thereof.

At block 702, a client device (e.g., client 140-160) receives a video conference stream. For example, a user may use a video conferencing application executing on the client device to begin a video conference. In response, the video conference provider (e.g., video conference provider 110) begins a video conference and transmits a video conference stream to the client device. The client device then displays the video conference stream within the video conferencing application.

At block 704, the client device receives a request to share a screen. For example, a user can select control 324 in GUI 300 of the video conferencing application to start a screen share. In response to the request, the video conferencing application can prompt the user to select what content they would like to share (e.g., from sharing window 332). Based on the response to the selection of content to be shared, the video conferencing application will update the shared content window 402 with the selected content. For example, if the user selects, from the sharing window, to have their second monitor shared, then the shared content window 402 will be updated to mirror the content currently displayed on the second monitor as part of a shared content layer. In addition, the shared content layer can also be provided to the service provider device to be shared with other client devices to display in their respective shared content windows 402.

At block 706, the client device receives an annotation from a user input device in communication with the client device. For example, one of the users participating in the video conference stream, and viewing the shared screen, may use an input device to select a control, such as control 338 in the GUI depicted in FIGS. 4A and 4B. By clicking on the control 338, the user is able to create one or more annotations, such as annotations 408, 410. For instance, the user may click on control 338 and draw a circle around a portion of bar graph shown in the shared content window 402, as shown in FIG. 4B. The received annotation can be a new annotation or a modification (e.g., editing, moving, removing, etc.) of an existing annotation. The annotation can also be received from the local client device, or it can be received from one of the other client devices (directly or via the service provider device) participating in the video conference stream.

At block 708, the client device captures one or more snapshots for the received annotation. The one or more snapshots can include any number, size, shape, etc. snapshots necessary for capturing a target location for the annotation. For example, the snapshots as discussed with respect to FIGS. 5A and 5B can be implemented. The client device receiving the annotation (block 706) can create the one or more snapshots, to be shared with other client devices, or each of the clients can separately create the one or more snapshots in response to receiving an annotation. Similarly, the service provider device can receive an annotation and create the one or more snapshots to be distributed to each of the client devices. The one or more snapshots can be used to create a pattern layer that is transparent to the users viewing the shared content window 402. As discussed in greater detail herein, the pattern layer can be used to determine where the annotations should be situated at any given moment.

At block 710, the client device anchors the annotation to content within the shared content layer. Anchoring the annotation can include creating a link between the annotation and the snapshot(s) of content within the shared content window 402 at the time of the creation of the annotation. Similar to block 708, block 710 can be performed at one of the clients, at each client separately, or at the service provider device. Thereafter, a determination whether any of the snapshots capturing during the current video conference session match what is currently displayed within the shared content window 402 can be made. As discussed in greater detail herein, the matching can be determined using any combination of artificial intelligence, machine learning, pattern matching, etc. When a match is identified, the annotation associated with the matched snapshot can be rendered at that location for display.

At block 712, in response to a match determination, the client device situates the annotation within the shared content window 402. Situating the annotation can include moving the annotation to the location that the annotation is linked to, removing the annotation if the location that the annotation is linked to is no longer visible, and adding the annotation if the location that was previously not visible becomes visible again. When the annotation is displayed, it appears with the video conference stream in the location at which the user originally selected. For example, the annotation 410 shown in FIG. 4A will remain at the target location, even if the shared screen is moved upward, as shown in FIG. 4D.

Although the steps of method 700 are discussed with respect to the client device, as would be appreciated by one skilled in the art, the steps can be performed by any combination of devices within the system. For example, a service provider device can perform all of the steps, or a combination of the client device and the service provider device can perform the steps. In another example, the client device can receive the annotation, take a snapshot, and the service provider can receive the snapshot to perform any image recognition processing that may be too intensive for the client device.

Figure 8:
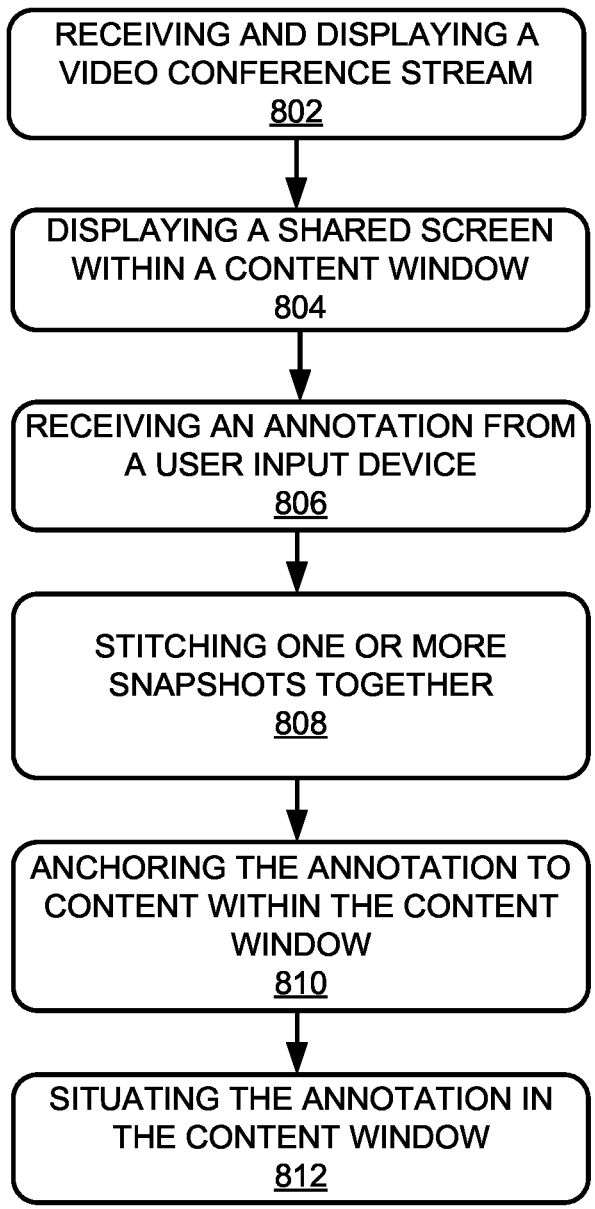
FIG. 8 is a flow chart depicting a process for using a reference in accordance with various embodiments.

Referring now to FIG. 8, FIG. 8 shows an example method 800 for creating anchored annotations using image stitching. The method 800 of FIG. 8 will be described with respect to the systems 100, 200 shown in FIGS. 1 and 2; however, any suitable system according to this disclosure may be employed. Although certain blocks of method 800 are discussed with respect to being performed by a client device, any combination of the steps (all or some) could be performed by each client, one client (and shared with other clients or the service provider device), by the service provider device, or a combination thereof.

At block 802, a client device (e.g., client 140-160) receives a video conference stream. For example, a user may use a video conferencing application executing on the client device to begin a video conference. In response, the video conference provider (e.g., video conference provider 110) begins a video conference and transmits a video conference stream to the client device. The client device then displays the video conference stream within the video conferencing application.

At block 804, the client device receives a request to share a screen. For example, a user can select control 324 in GUI 300 of the video conferencing application to start a screen share. In response to the request, the video conferencing application can prompt the user to select what content they would like to share (e.g., from sharing window 332). Based on the response to the selection of content to be shared, the video conferencing application will update the shared content window 402 with the selected content. For example, if the user selects, from the sharing window, to have their second monitor shared, then the shared content window 402 will be updated to mirror the content currently displayed on the second monitor as part of a shared content layer. In addition, the shared content layer can also be provided to the service provider device to be shared with other client devices to display in their respective shared content windows 402.

At block 806, the client device receives an annotation from a user input device in communication with the client device. For example, one of the users participating in the video conference stream, and viewing the shared screen, may use an input device to select a control, such as control 338 in the GUI depicted in FIGS. 4A and 4B. By clicking on the control 338, the user is able to create one or more annotations, such as annotations 408, 410. For instance, the user may click on control 338 and draw a circle around a portion of bar graph shown in the shared content window 402, as shown in FIG. 4B. The received annotation can be a new annotation or a modification (e.g., editing, moving, removing, etc.) of an existing annotation. The annotation can also be received from the local client device, or it can be received from one of the other client devices (directly or via the service provider device) participating in the video conference stream.

At block 808, the client device captures a snapshot of the shared content window 402 in response to the received annotation. Each time an annotation is received (or changed) a new snapshot of the shared content window 402 can be captured. Once there is more than one snapshot for a particular shared content window 402, the snapshots can be stitched together to create a single stitched shared content layer. For example, the stitching process as discussed with respect to FIGS. 6A and 6B can be implemented to create the stitched shared content layer. The client device receiving the annotation (block 806) can create perform the stitching, to be shared with other client devices, or each of the clients can separately perform the stitching in response to receiving an annotation. Similarly, the service provider device can receive an annotation and perform the stitching to be distributed to each of the client devices.

At block 810, the client device anchors the annotation to content within the shared content layer. Anchoring the annotation can include determining whether any portion of the stitched shared content layer matches what is currently displayed within the shared content window 402. As discussed in greater detail herein, the matching can be determined using any combination of artificial intelligence, machine learning, pattern matching, etc. When a match is identified, the portion of the stitched shared content layer matching the shared content window 402 can be rendered at that location for display. Similar to block 808, block 810 can be performed at one of the clients, at each client separately, or at the service provider device.

At block 812, in response to a match determination, the client device situates the annotation within the shared content window 402. Situating the annotation can include moving the annotation to the location that the annotation is linked to, removing the annotation if the location that the annotation is linked to is no longer visible, and adding the annotation if the location that was previously not visible becomes visible again. When the annotation is displayed, it appears with the video conference stream in the location at which the user originally selected. For example, the annotation 410 shown in FIG. 4A will remain at the target location, even if the shared screen is moved upward, as shown in FIG. 4D. Similar to block 810, block 812 can be performed at one of the clients, at each client separately, or at the service provider device.

Although the steps of method 800 are discussed with respect to the client device, as would be appreciated by one skilled in the art, the steps can be performed by any combination of devices within the system. For example, the service provider device can perform all of the steps, or a combination of the client device and the service provider device can perform the steps.

While the operations of processes 700 and 800 are described as being performed by the systems 100, 200, it should be understood that any suitable device may be used to perform one or more operations of this process. Processes 700 and 800 described above) are illustrated as logical flow diagrams, each operation of which represents a sequence of operations that can be implemented in hardware, computer instructions, or a combination thereof. Additionally, any of the blocks can be performed by the various components of the system 100, 200. For example, the blocks can be performed on a server or cloud, on a client computing device, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes 700 and 800.

Figure 9:
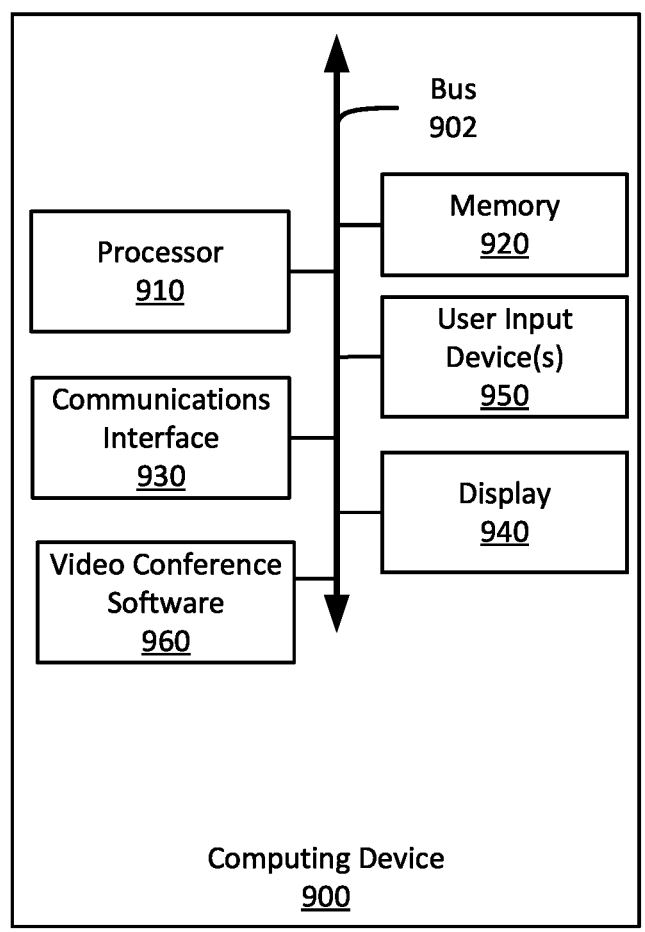
FIG. 9 shows an example computing device suitable for use with systems and methods in accordance with various embodiments.

Referring now to FIG. 9, FIG. 9 shows an example computing device 900 suitable for use in example systems or methods according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for in-meeting follow-up schedulers for video conferences according to different examples, such as part or all of the example methods 700, 800 described above with respect to FIGS. 7 and 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a video conferencing application 960 to enable a user to join and participate in a video conference, such as a conventional meeting or webinar, by receiving multimedia streams from a video conference provider, sending multimedia streams to the video conference provider, joining and leaving breakout rooms, engaging in user interactions during a virtual meeting, etc. such as described throughout this disclosure, etc.

The computing device 900 also includes a communications interface 940. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and Conly; B and Conly; and A and B and C.

What is claimed is:

1. A method comprising:
   receiving a video conference stream at a client device;
   displaying a shared screen within a content window of the video conference stream on a display in communication with the client device;
   receiving one or more annotations from a user input device in communication with the client device;
   capturing one or more snapshots of one or more portions of the shared screen associated with the one or more annotations;
   anchoring the annotation to content of the shared screen within the content window comprising matching the one or more snapshots with the content of the shared screen; and
   situating the one or more annotations within the content window based on the anchoring.

2. The method of claim 1, wherein the annotation comprises at least one of a pointer, text, a line, an outline, a shape, a drawing, a stamp, and a highlight.

3. The method of claim 1, wherein the one or more snapshots comprises a snapshot of the content window when the one or more annotations is received.

4. The method of claim 3, further comprising:
   capturing a first snapshot of the content window when a first annotation is received;
   capturing a second snapshot of the content window when a second annotation is received; and
   stitching together the first snapshot and the second snapshot.

5. The method of claim 1, wherein the one or more snapshots comprises a snapshot of a portion of a content layer within the content window proximate to a location that the one or more annotations is received.

6. The method of claim 5, further comprising:
   comparing the snapshot of the portion of the content layer to the shared screen within the content window;
   determining that the snapshot of the portion of the content layer matches a portion of the shared screen within the content window; and
   overlaying an annotation layer over the matched portion of the shared screen within the content window.

7. The method of claim 5, wherein each of the one or more snapshots comprises a grid or array of snapshots associated with each of the one or more annotations.

8. The method of claim 1, further comprising creating a recording of the video conference stream, the recording including a content layer and an annotation layer.

9. A non-transitory computer-readable medium comprising processor-executable instructions configured to cause one or more processors to:
- receive a video conference stream at a client device;
- display a shared screen within a content window of the video conference stream on a display in communication with the client device;
- receive one or more annotations from a user input device in communication with the client device;
- capture one or more snapshots corresponding to one or more portions of the shared screen associated with the one or more annotations;
- anchor the annotation to content of the shared screen within the content window comprising matching the one or more snapshots with the content of the shared screen; and
- situate the one or more annotations within the content window based on the anchoring.

10. The non-transitory computer-readable medium of claim 9, wherein the annotation comprises at least one of a pointer, text, a line, an outline, a shape, a drawing, a stamp, and a highlight.

11. The non-transitory computer-readable medium of claim 9, further comprising:
- capturing a first snapshot of the content window when a first annotation is received;
- capturing a second snapshot of the content window when a second annotation is received; and
- stitching together the first snapshot and the second snapshot.

12. The non-transitory computer-readable medium of claim 9, wherein the one or more snapshots comprises a snapshot of a portion of a content layer within the content window proximate to a location that the one or more annotations is received.

13. The non-transitory computer-readable medium of claim 12, further comprising:
- comparing the snapshot of the portion of the content layer to the shared screen within the content window;
- determining that the snapshot of the portion of the content layer matches a portion of the shared screen within the content window; and
- overlaying an annotation layer over the matched portion of the shared screen within the content window.

14. The non-transitory computer-readable medium of claim 12, wherein each of the one or more snapshots comprises a grid or array of snapshots associated with each of the one or more annotations.

15. A device comprising:
- a communications interface;
- a non-transitory computer-readable medium; and
- one or more processors configured to execute processor-executable instructions stored in the non-transitory computer-readable medium to:
  - receive a video conference stream at a client device;
  - display a shared screen within a content window of the video conference stream on a display in communication with the client device;
  - receive one or more annotations from a user input device in communication with the client device;
  - capture one or more snapshots corresponding to one or more portions of the shared screen associated with the one or more annotations;
  - anchor the one or more annotations to content of the shared screen within the content window comprising matching the one or more snapshots with the content of the shared screen; and
  - situate the one or more annotations within the content window based on the anchoring.

16. The non-transitory computer-readable medium of claim 15, wherein the annotation comprises at least one of a pointer, text, a line, an outline, a shape, a drawing, a stamp, and a highlight.

17. The non-transitory computer-readable medium of claim 15, further comprising:
- capturing a first snapshot of the content window when a first annotation is received;
- capturing a second snapshot of the content window when a second annotation is received; and
- stitching together the first snapshot and the second snapshot.

18. The non-transitory computer-readable medium of claim 15, wherein the one or more snapshots comprises a snapshot of a portion of a content layer within the content window proximate to a location that the one or more annotations is received.

19. The non-transitory computer-readable medium of claim 18, further comprising:
- comparing the snapshot of the portion of the content layer to the shared screen within the content window;
- determining that the snapshot of the portion of the content layer matches a portion of the shared screen within the content window; and
- overlaying an annotation layer over the matched portion of the shared screen within the content window.

20. The non-transitory computer-readable medium of claim 18, wherein each of the one or more snapshots comprises a grid or array of snapshots associated with each of the one or more annotations.

* * * * *